(No Model.)

H. HORSTER.
MACHINE FOR QUILLING FEATHERS.

No. 577,807.    Patented Feb. 23, 1897.

2 Sheets—Sheet 1.

Witnesses:

Inventor
Henry Horster
By J. Clement Smith
Attorney (No Model.) 2 Sheets—Sheet 2.

H. HORSTER.
MACHINE FOR QUILLING FEATHERS.

No. 577,807. Patented Feb. 23, 1897.

Witnesses:
Inventor
Henry Horster
By Clement Smith
Attorney

United States Patent Office.

HENRY HORSTER, OF EVANSVILLE, INDIANA, ASSIGNOR OF ONE-HALF TO SAUNDERS B. SANSOM, OF SAME PLACE.

MACHINE FOR QUILLING FEATHERS.

SPECIFICATION forming part of Letters Patent No. 577,807, dated February 23, 1897.

Application filed September 1, 1896. Serial No. 604,567. (No model.)

*To all whom it may concern:*

Be it known that I, HENRY HORSTER, a citizen of the United States, residing at Evansville, in the county of Vanderburg and State of Indiana, have invented certain new and useful Improvements in Machines for Quilling Feathers; and I do declare the following to be a full, clear, and exact description of the invention, such as will enable others skilled in the art to which it appertains to make and use the same.

My invention relates to a machine for expeditiously separating quills and large coarse feathers from down and fine feathers; and its novelty and many advantages will be fully understood from the following description and claims when taken in conjunction with the annexed drawings, in which—

Figure 1:
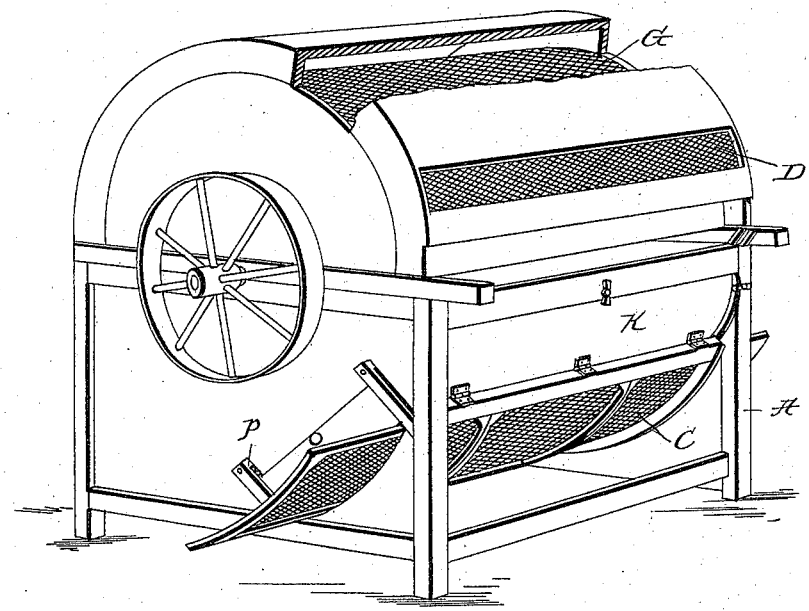
Figure 2:
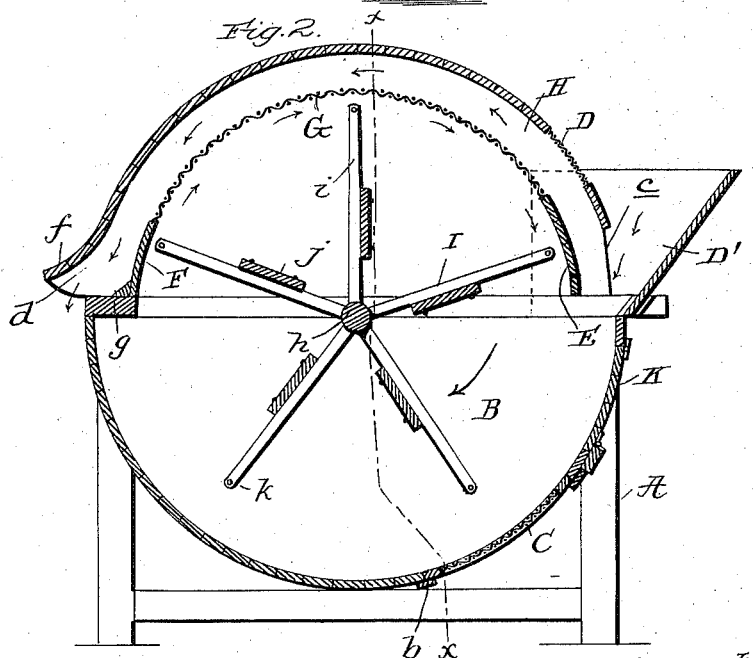
Figure 3:
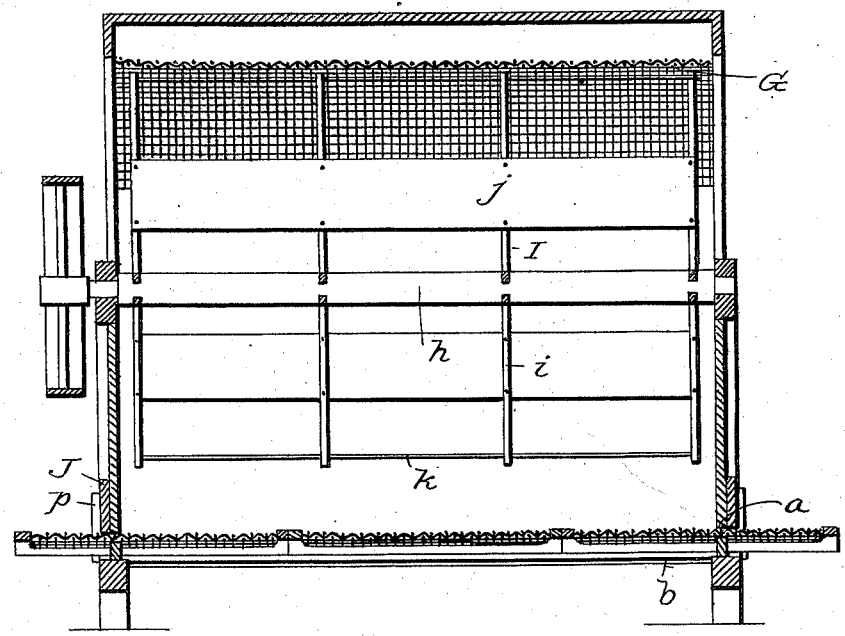
Figure 4:
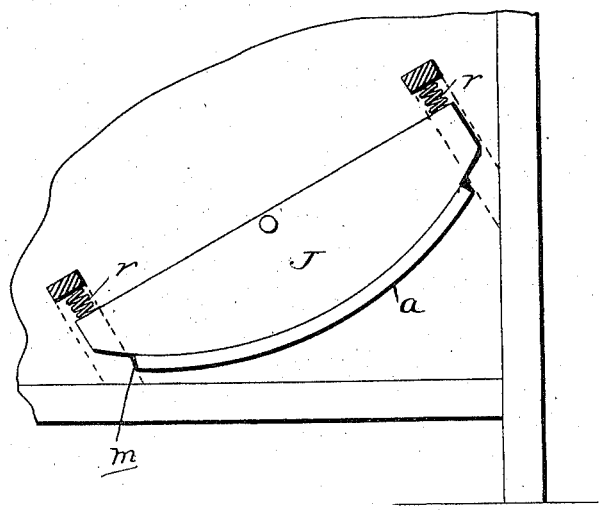

Figure 1 is a perspective view of my improved machine with a portion of the shell or casing broken away and one of the quill-receiving screens partly removed. Fig. 2 is a transverse section of the machine. Fig. 3 is a longitudinal section taken in the plane indicated by the line $x\,x$ of Fig. 2; and Fig. 4 is an enlarged detail elevation with parts in section, illustrating one of the doors for closing the openings in the shell or casing through which the quill-receiving screens are inserted and removed.

In the said drawings similar letters designate corresponding parts in all of the several views, referring to which—

A indicates the main frame of my improved machine, which may be of any suitable construction, and B indicates the shell or casing, which is connected to and supported by the frame A. This shell or casing B is of a general circular form in cross-section, as better shown in Fig. 2, and it is provided in its bottom with the opening $a$ and the ways $b$ for the reception of the removable quill-screens C, (presently described,) and is also provided at one end with the induction-opening $c$, which communicates with a feed-hopper D', and at its opposite end with the eduction-opening $d$, the latter opening being formed by curving the upper wall of the shell or casing outwardly, as indicated by $f$. The shell or casing B is further provided adjacent to the discharge-opening $d$ with the transverse inwardly-directed wall $g$, the purpose of which is to stop the quills and large coarse feathers and prevent them from being carried entirely around the shell or casing by the agitator or stirrer, (presently described,) and said shell or casing B is also provided, at about the distance illustrated above the induction-opening, with a screen D of fine mesh, the function of which will be presently described.

E indicates a curved wall which extends the full length of the casing and is arranged at about the elevation and at about the proportional distance illustrated from the opening $c$. F indicates a similar wall which is arranged upon the wall $g$, and G indicates a coarse screen, preferably of wire, which is curved in conformity with the shell or casing and is connected to the walls E and F and the end walls of the shell or casing, as shown. The screen G serves, in conjunction with the upper portion of the shell or casing, to form a passage H to the discharge-opening $d$, and its meshes or openings are sufficiently large to permit of the passage of the down and fine feathers to the said passage H, as will be presently described.

I indicates the agitator or stirrer of the machine. This agitator or stirrer I may be of any construction suitable to the purposes of my invention, but I prefer to have it comprise the shaft $h$, which is journaled in the end walls of the casing B, the radial arms $i$, the blades $j$, connected to the arms at an intermediate point in the length thereof, and the rods $k$, which are connected to the arms at the outer ends thereof, as shown.

The quill-receiving screens C are arranged end to end in the ways $b$ of the shell or casing B, as better shown in Fig. 1, and they are curved in conformity to the bottom of the shell or casing and are designed to be inserted through an opening $m$ in one end wall of the casing and removed through a similar opening in the other end wall, the introduction of an empty screen at one end of the casing being utilized to push a full screen out the other end thereof. The said openings $m$ in the end walls of the casing are normally closed by the doors J, which are arranged to slide in ways $p$, and are pressed downwardly upon the screens by springs $r$, (see Fig. 4,) so as to permit of the introduction and removal of the quill-screens while the machine is in operation without allowing any of the feathers or down to escape.

In the practical operation of the invention the agitator or stirrer I is rotated in the direction indicated by the large arrow in Fig. 2, and the feathers to be separated and quilled, which have been previously cleaned and renovated, are fed into the feed-hopper. These feathers are drawn by the blades $j$ and rods $k$ through the opening $c$ and are carried thereby around the shell or casing until they reach the stop $g$, which will permit the passage of the down and fine feathers, but will stop and throw back the large coarse feathers and quills, which by reason of their greater weight and centrifugal action occupy the outer portion of the mass. The down and fine feathers which are carried upwardly past the stop $g$ are forced by the rods $k$ of the stirrer through the openings or meshes of the screen G and up into the passages H, and are carried along said passages by a blast of air in the direction indicated by arrow to the discharge-opening $d$. Such blast or current of air is created by the blades $j$ of the stirrer or agitator I, and striking against the end wall of the shell or casing it is deflected thereby up into the passage H, and it is increased in strength by the current of air which enters through the fine screen D above the feed-opening $c$. The quills and large coarse feathers, which are thrown back by the stop $g$, are forced by the stirrer or agitator I into engagement with the screens C, and with said screens may be readily removed from the machine without the necessity of stopping the same and without permitting the escape of any down or feathers, which is an important advantage and a desideratum in this class of devices.

It will be observed from the foregoing that while very simple my improved machine is adapted to effectually and expeditiously separate large coarse feathers from down and fine feathers, and is also adapted to be continuously operated, it being unnecessary to stop the machine when feathers are to be fed thereto.

In order to permit of convenient access being had to the interior of the casing A when necessary, I prefer to provide said casing with a door $k$, as shown.

I have in some respects specifically described the construction and relative arrangement of the parts of my improved machine in order to impart a full, clear, and exact understanding of my invention. I do not desire, however, to be understood as confining myself to such specific construction and arrangement of parts, as such changes or modifications may be made in practice as fairly fall within the scope of my invention.

Having described my invention, what I claim is—

1. The machine for the purpose described comprising a casing or shell having induction and eduction openings for feathers, a screen D, arranged in the casing or shell above the induction-opening, the walls E, F, arranged in the casing or shell adjacent to the induction and eduction openings respectively, the screen connected at its opposite ends to the walls E, F, said screen and walls serving in conjunction with the top wall of the shell or casing to form a passage connected at its opposite ends with the eduction-opening and the interior of the casing or shell and communicating with the screened opening, a removable screen arranged at the bottom of the shell or casing, and a rotary stirrer or agitator arranged in said shell or casing, substantially as specified.

2. In a machine for the purpose described the combination of the casing or shell having induction and eduction openings at opposite ends, a screen D, arranged in the top wall of the casing or shell above the induction-opening, the walls E, F, arranged in the casing or shell adjacent to the induction or eduction openings respectively, the screen connected at its opposite ends to the walls E, F; said screen and walls serving in conjunction with the top wall of the shell or casing to form a passage connected at its opposite ends with the eduction-opening and the interior of the shell or casing and communicating with the screened opening and a rotary agitator or stirrer arranged in the shell or casing, substantially as specified.

3. A machine for the purpose described, comprising a casing or shell having induction and eduction openings for feathers and also having openings adjacent to its bottom for the insertion and removal of screens, spring-pressed doors for closing said openings, the said removable screens, a stop arranged below the eduction-opening of the casing or shell, the walls E, F, arranged adjacent to the induction and eduction openings, respectively, of the casing or shell, the screen connected at its opposite ends to the walls E, F; said screen and walls serving in conjunction with the top wall of the shell or casing to form a passage connected at its opposite ends with the eduction-opening and the interior of the casing or shell, and the rotary agitator or stirrer arranged in the casing or shell, substantially as specified.

In testimony whereof I affix my signature in presence of two witnesses.

HENRY HORSTER.

Witnesses:
S. B. SANSOM,
FRANK J. BETTAG.